(12) United States Patent
Oscherov et al.

(10) Patent No.: US 10,958,752 B2
(45) Date of Patent: *Mar. 23, 2021

(54) PROVIDING ACCESS TO MANAGED CONTENT

(71) Applicant: Open Text Corporation, Waterloo (CA)

(72) Inventors: Alexander Oscherov, Danville, CA (US); Victor Spivak, San Mateo, CA (US); Eric Lundblad, Oakland, CA (US); Alex Treyger, San Jose, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,204

(22) Filed: Jul. 29, 2019

(65) Prior Publication Data

US 2019/0356751 A1 Nov. 21, 2019

Related U.S. Application Data

(63) Continuation of application No. 15/677,732, filed on Aug. 15, 2017, now Pat. No. 10,404,821, which is a continuation of application No. 15/003,595, filed on Jan. 21, 2016, now Pat. No. 9,769,278, which is a continuation of application No. 13/869,864, filed on Apr. 24, 2013, now Pat. No. 9,304,966, which is a continuation of application No. 11/229,317, filed on Sep. 15, 2005, now Pat. No. 8,447,827.

(51) Int. Cl.
*G06F 15/16* (2006.01)
*H04L 29/08* (2006.01)
*G06F 16/14* (2019.01)
*G06F 15/173* (2006.01)

(52) U.S. Cl.
CPC ........ *H04L 67/2842* (2013.01); *G06F 15/173* (2013.01); *G06F 16/14* (2019.01); *H04L 67/1097* (2013.01); *H04L 67/28* (2013.01)

(58) Field of Classification Search
CPC ............ H04L 67/2842; H04L 67/1097; H04L 67/28; G06F 16/14; G06F 15/173
See application file for complete search history.

(56) References Cited

U.S. PATENT DOCUMENTS 5,333,312 A 7/1994 Wang et al.
6,389,422 B1 5/2002 Doi et al.
(Continued)

OTHER PUBLICATIONS

International Search Report and Written Opinion for International Patent Application No. PCT/US06/36197, dated Aug. 3, 2007, 7 pgs.

(Continued)

*Primary Examiner* — Cheikh T Ndiaye
(74) *Attorney, Agent, or Firm* — Sprinkle IP Law Group

(57) ABSTRACT

A method for providing local access to managed content is disclosed. The method comprises receiving from a remote host a request to perform an operation with respect to content associated with a set of managed content and obtaining information required to respond to the request. The method further comprises providing in response to the request a content locator usable to perform the requested operation through direct communication with a content system through which the content is accessible.

20 Claims, 15 Drawing Sheets

(56) References Cited

U.S. PATENT DOCUMENTS

| | | | |
|---|---|---|---|
| 6,757,712 | B1 | 6/2004 | Bastian et al. |
| 6,804,674 | B2 | 10/2004 | Hsiah et al. |
| 6,832,253 | B1 | 12/2004 | Auerbach |
| 6,879,998 | B1* | 4/2005 | Raciborski ............ G06F 16/951 709/219 |
| 7,080,158 | B1* | 7/2006 | Squire ................. H04L 67/2814 370/389 |
| 7,139,811 | B2* | 11/2006 | Lev Ran ................ G06F 9/546 709/217 |
| 7,284,017 | B2 | 10/2007 | Baune |
| 7,340,571 | B2 | 3/2008 | Saze |
| 7,558,837 | B1 | 7/2009 | Denny |
| 7,725,435 | B1 | 5/2010 | Li et al. |
| 7,761,572 | B1 | 7/2010 | Auerbach |
| 7,996,535 | B2 | 8/2011 | Auerbach |
| 8,082,334 | B1 | 12/2011 | Oscherov |
| 8,396,938 | B2 | 3/2013 | Oscherov |
| 8,447,827 | B2 | 5/2013 | Oscherov |
| 8,543,700 | B1 | 9/2013 | Randall et al. |
| 9,304,966 | B2 | 4/2016 | Oscherov |
| 9,769,278 | B2 | 9/2017 | Oscherov |
| 1,040,482 | A1 | 9/2019 | Oscherov et al. |
| 2001/0014103 | A1 | 8/2001 | Burns et al. |
| 2002/0198937 | A1* | 12/2002 | Diwan ................. H04L 67/1008 709/203 |
| 2003/0050979 | A1 | 3/2003 | Takahashi |
| 2003/0065739 | A1 | 4/2003 | Shnier |
| 2003/0187917 | A1* | 10/2003 | Cohen .................. H04L 69/329 709/203 |
| 2003/0187956 | A1 | 10/2003 | Belt et al. |
| 2003/0229645 | A1 | 12/2003 | Mogi |
| 2004/0111398 | A1 | 6/2004 | England et al. |
| 2004/0148344 | A1 | 7/2004 | Navar et al. |
| 2004/0216084 | A1 | 10/2004 | Brown et al. |
| 2005/0010653 | A1 | 1/2005 | McCanne |
| 2005/0044260 | A1 | 2/2005 | Abramson et al. |
| 2005/0120050 | A1 | 6/2005 | Myka et al. |
| 2005/0149575 | A1 | 7/2005 | Baune |
| 2005/0160154 | A1 | 7/2005 | Raciborski et al. |
| 2005/0216524 | A1 | 9/2005 | Gomes et al. |
| 2005/0235282 | A1 | 10/2005 | Anderson |
| 2005/0246393 | A1 | 11/2005 | Coates et al. |
| 2005/0267950 | A1 | 12/2005 | Kitamura |
| 2006/0041614 | A1 | 2/2006 | Oe |
| 2006/0053250 | A1 | 3/2006 | Saze |
| 2006/0064536 | A1 | 3/2006 | Tinker |
| 2006/0080546 | A1 | 4/2006 | Brannon et al. |
| 2006/0167979 | A1* | 7/2006 | Fuchs ................. H04L 67/2842 709/203 |
| 2006/0294223 | A1 | 12/2006 | Glasgow et al. |
| 2008/0177803 | A1 | 7/2008 | Fineberg et al. |
| 2017/0366639 | A1 | 12/2017 | Oscherov |

OTHER PUBLICATIONS

International Search Report and Written Opinion for International Patent Application No. PCT/US06/36324, dated Nov. 19, 2007, 5 pgs.

International Preliminary Report on Patentability and Written Opinion for International Patent Application No. PCT/US06/36197, dated Mar. 18, 2008, 5 pgs.

International Preliminary Report on Patentability and Written Opinion for International Patent Application No. PCT/US06/36324, dated Mar. 18, 2008, 5 pgs.

Office Action for U.S. Appl. No. 11/229,036, dated Sep. 12, 2008, 13 pgs.

Office Action for U.S. Appl. No. 11/229,317, dated Sep. 23, 2008, 15 pgs.

Office Action for U.S. Appl. No. 11/229,318, dated Sep. 26, 2008, 14 pgs.

Office Action for U.S. Appl. No. 11/229,036, dated Mar. 12, 2009, 14 pgs.

Office Action for U.S. Appl. No. 11/229,317, dated Apr. 1, 2009, 17 pgs.

Office Action for U.S. Appl. No. 11/229,318, dated May 11, 2009, 15 pgs.

Office Action for U.S. Appl. No. 11/823,608, dated Jun. 19, 2009, 12 pgs.

Office Action for U.S. Appl. No. 11/229,036, dated Aug. 11, 2009, 15 pgs.

Office Action for U.S. Appl. No. 11/229,317, dated Oct. 27, 2009, 15 pgs.

Office Action for U.S. Appl. No. 11/229,318, dated Dec. 7, 2009, 16 pgs.

Office Action for U.S. Appl. No. 11/823,608, dated Dec. 30, 2009, 11 pgs.

Office Action for U.S. Appl. No. 11/229,036, dated Feb. 22, 2010, 14 pgs.

Office Action for U.S. Appl. No. 11/229,318, dated Jun. 21, 2010, 22 pgs.

Office Action for U.S. Appl. No. 11/229,317, dated Jul. 7, 2010, 18 pgs.

Office Action for U.S. Appl. No. 11/229,318, dated Oct. 15, 2010, 24 pgs.

Office Action for U.S. Appl. No. 11/229,317, dated Feb. 4, 2011, 24 pgs.

Office Action for U.S. Appl. No. 11/229,317, dated Aug. 4, 2011, 27 pgs.

Office Action for U.S. Appl. No. 11/229,317, dated Apr. 17, 2012, 28 pgs.

Office Action for U.S. Appl. No. 11/229,036, dated Jun. 14, 2012, 13 pgs.

Office Action for U.S. Appl. No. 11/823,608, dated Aug. 15, 2012, 12 pgs.

Office Action for U.S. Appl. No. 11/823,608, dated Apr. 29, 2013, 8 pgs.

Office Action for U.S. Appl. No. 13/869,864, dated Feb. 28, 2014, 15 pgs.

Office Action for U.S. Appl. No. 13/869,864, dated Sep. 12, 2014, 15 pgs.

Office Action for U.S. Appl. No. 13/869,864 dated Mar. 27, 2015, 11 pgs.

Office Action for U.S. Appl. No. 15/003,595, dated Aug. 26, 2016, 13 pgs.

Office Action for U.S. Appl. No. 14/677,732, dated Oct. 16, 2018, 13 pgs.

Notice of Allowance for U.S. Appl. No. 14/677,732, dated Apr. 3, 2019, 5 pgs.

* cited by examiner ize PROVIDING ACCESS TO MANAGED CONTENT

CROSS REFERENCE TO OTHER APPLICATIONS

This application is a continuation of, and claims a benefit of priority under 35 U.S.C. 120 of the filing date of U.S. patent application Ser. No. 15/677,732 filed Aug. 15, 2017, entitled PROVIDING ACCESS TO MANAGED CONTENT, issued as U.S. Pat. No. 10,404,821, which is a continuation of, and claims a benefit of priority under 35 U.S.C. 120 of the filing date of U.S. patent application Ser. No. 15/003,595 filed Jan. 21, 2016, entitled PROVIDING LOCAL ACCESS TO MANAGED CONTENT, issued as U.S. Pat. No. 9,769,278, which is a continuation of, and claims a benefit of priority under 35 U.S.C. 120 of the filing date of U.S. patent application Ser. No. 13/869,864, filed Apr. 24, 2013, entitled PROVIDING LOCAL ACCESS TO MANAGED CONTENT, issued as U.S. Pat. No. 9,304,966, which is a continuation of, and claims a benefit of priority under 35 U.S.C. 120 of the filing date of U.S. patent application Ser. No. 11/229,317, filed Sep. 15, 2005, entitled PROVIDING LOCAL ACCESS TO MANAGED CONTENT, issued as U.S. Pat. No. 8,447,827, which are all incorporated herein by reference for all purposes.

BACKGROUND OF THE INVENTION

Content management systems provide the capability of managing content including typically the ability to search a body of stored content for and retrieve particular content of interest. Additional functionality provided by a content management system may include, without limitation, tracking revisions, versions, review, approvals, distribution, life cycle and retention policy information, file name, file type, file creator, application used to create, owner, and any other data and/or metadata associated with stored content. In a typical content management system, a request from a user to retrieve content, such as a particular file, version, or other stored object, results in the content management system obtaining the requested content from a content storage location, e.g., a content server, and providing the requested content to the user. Because the content management system has limited throughput, this middleman role limits the performance of data delivery to and from the content server or other storage location. This is especially notable when a user makes a number of requests for the same content over a short period of time. It would be beneficial to be able to utilize the advantages of a content management system without suffering the performance limitations the content management system can impose.

BRIEF DESCRIPTION OF THE DRAWINGS

Various embodiments of the invention are disclosed in the following detailed description and the accompanying drawings.

DETAILED DESCRIPTION

Figure 1:
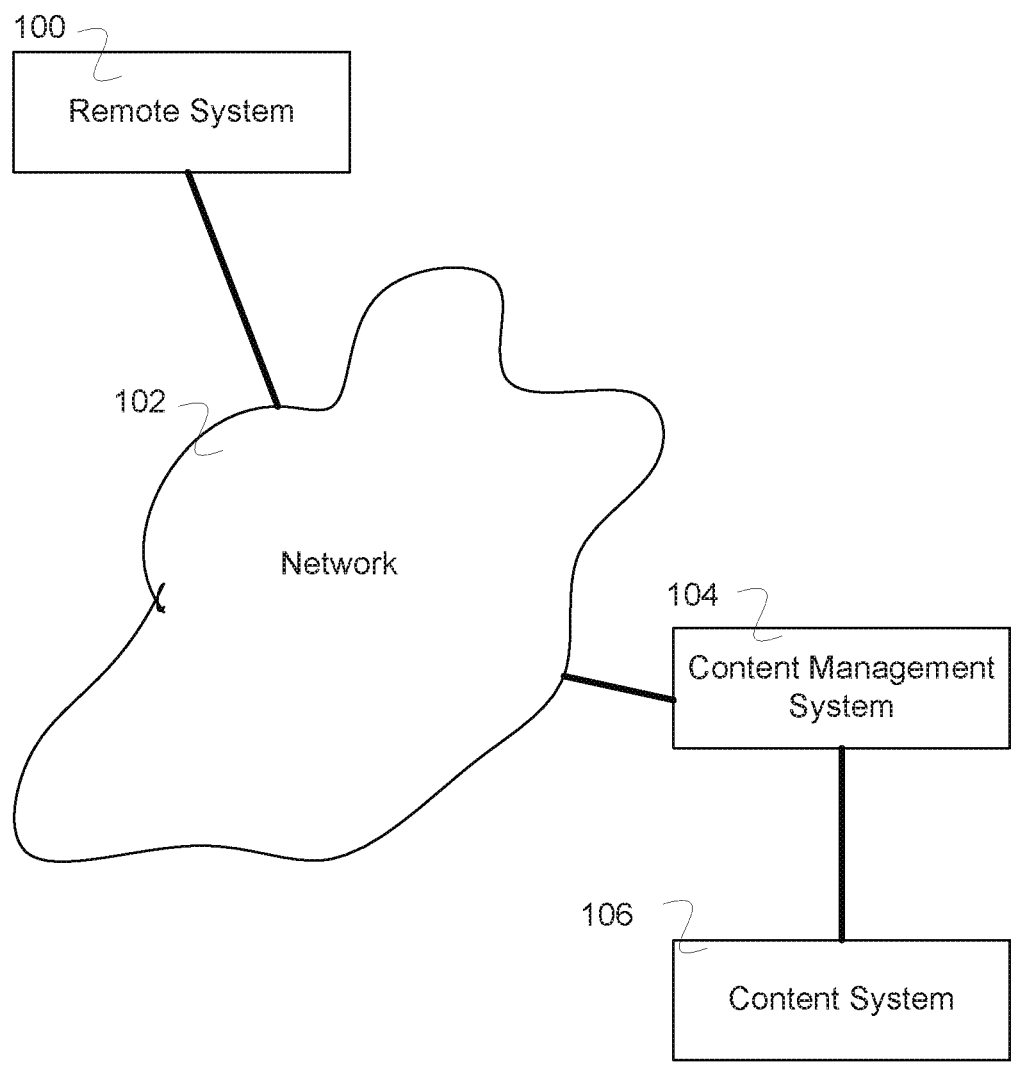
FIG. 1 is a block diagram illustrating a typical prior art system for providing access to managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing local access to managed content is disclosed. A remote system sends to a content management system a request associated with particular content, such as a request to retrieve and/or store (write) particular content. Information required to respond to the request is obtained from a content system. One or more content locators, based at least in part on the information obtained from the content system, are provided to the remote system. Each of the one or more content locators enables the remote system to retrieve the requested content locally from one of a plurality of local content systems, such as a local cache server, or directly write to one of a plurality of local content systems, as applicable. The local content system is selected as the best to interact with the remote system based on criteria such as distance from the remote system to the selected local content system, available bandwidth for the given selected local content system, speed of access between the remote system and the selected local content system, or any other relevant metric. In some embodiments, one or more remote hosts are associated with a local cache server at which recently and/or frequently accessed managed content is stored, e.g., to enable such content to be accessed directly from the local cache more quickly and/or efficiently than if the remote system were required to access the content indirectly through a content management system or directly from a more distant content server, such as a primary content server that serves as a primary repository for the content. In some embodiments, content made accessible directly from a local content system comprises a cached copy of corresponding content stored at a primary or other non-local content system. The cached copy is synchronized, e.g., periodically, as changes to the content occur either at the local or the non-local content system, or otherwise, to maintain the integrity and state of the content and to make the most up-to-date content available to users of the content.

FIG. 1 is a block diagram illustrating a typical prior art system for providing access to managed content. In the example shown, remote system 100 is connected to network 102. Content management system 104 is connected to network 102 and content system 106. Remote system 100 may be geographically remote from or geographically near to content management system 104. Network 102 may be a local area network, a wide area network, a wireless network, a wired network, the internet, or any other network for connecting systems. Content management system 104 may be connected to content system 106 using a direct connection, a local area network, a wide area network, or any other network for connecting systems. In some embodiments, content management system 104 and content system 106 are both implemented in one physical computer system. In some embodiments, content system 106 is implemented in one or more physical computer systems which each include one or more storage devices. In a typical approach, a user of remote system 100 communicates to content management system 104 via network 102 a request to retrieve content. The request may be for a specific stored object, e.g., a file identified by a unique identifier, or search criteria—e.g., word processing documents authored by a specified person on a specified date—may be provided. If specific content is identified, content management system 104 typically retrieves the content from content system 106 and sends the content to remote system 100 via network 102. In the case of a less specific request, e.g., a query to locate content that satisfies one or more criteria specified in the request, the content management system 104 typically obtains from content system 106 data and/or metadata associated with those stored objects, if any, that satisfy the criteria. Content system 106 typically maintains a database comprising metadata associated with the managed content and uses the metadata to identify stored objects that satisfy the criteria defined by the requesting user. All or a portion of the data or metadata returned by the content system 106 to the content management system 104, or other data derived at least in part from the returned data, is provided by content management system 104 to remote system 100. A user may subsequently use the data provided to request retrieval of a particular stored object.

Figure 2:
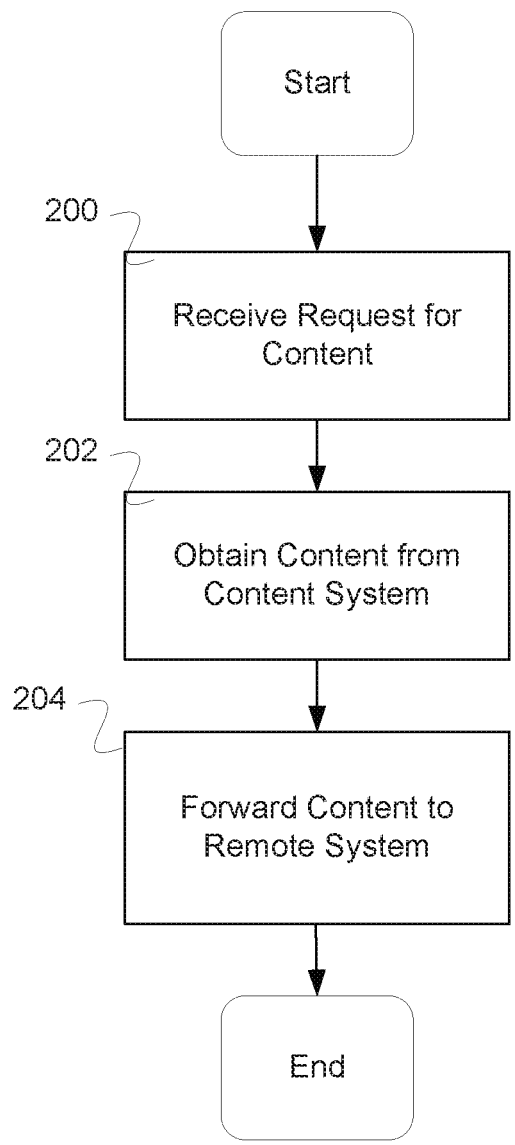
FIG. 2 illustrates an embodiment of a typical prior art process for providing access to managed content.

FIG. 2 illustrates an embodiment of a typical prior art process for providing access to managed content. In the example shown, in 200 a request for content is received at the content management system. In 202, the requested content is obtained by the content management system from the content system. In 204, the requested content is forwarded to the remote system from the content management system. As described above, the two step transfer approach shown in FIG. 2, in which requested content is first sent from the content system to the content management system and then sent by the content management system to the remote host that requested the content, can result in unwanted delay, especially in the case of large files and/or slow data transmission due to geographic remoteness of the remote host, limited transmission path capacity (bandwidth), high traffic, etc. and also especially when large files are accessed multiple times over a short period of time.

Figure 3:
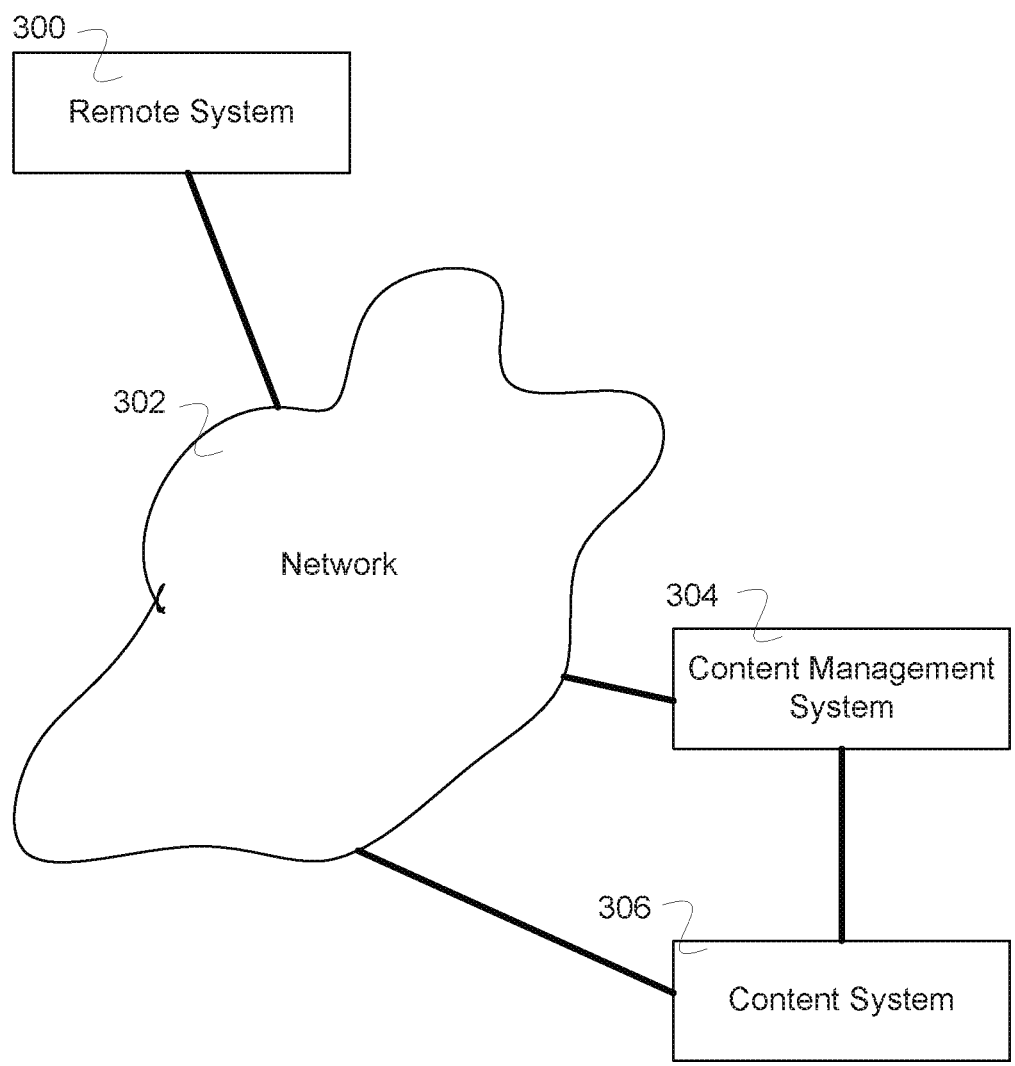
FIG. 3 is a block diagram illustrating an embodiment of a system for providing direct access to managed content.

FIG. 3 is a block diagram illustrating an embodiment of a system for providing direct access to managed content. In the example shown, remote system 300 is connected to network 302. In various embodiments, network 302 includes a local area network, a wide area network, a wireless network, a wired network, the internet, an intranet, and/or any other network for connecting systems. Content management system 304 is connected to network 302 and content system 306. Content system 306 is connected to content management system 304 and network 302. In various embodiments, content management system 304 is connected to content system 306 using a direct connection, a local area network, a wide area network, the internet, an intranet, and/or any other network for connecting systems. In some embodiments, content management system 304 does not have a connection to content system 306 except through network 302, and the content management system 304 and content system 306 exchange data via network 302. In some embodiments, content management system 304 and content system 306 are both implemented in one physical computer system. In various embodiments, remote system 300 is geographically remote from or geographically near to content management system 304. In some embodiments, remote system 300 is one of a plurality of hosts able to access content management system 304 via network 302. In some embodiments, content system 306 is implemented in one or more physical computer systems each of which includes one or more storage devices. In some embodiments, content management system 304 does not act as a middleman by obtaining requested content from content system 306 and forwarding the content on to the remote system 300. Instead, for at least some requests (e.g., for objects larger than a threshold size), the content management system 304 is configured to obtain from the content system 306, and content system 306 is configured to provide, data required by the content management system 304 to form a URL or other identifier, locator, etc. to be provided by the content management system 304 to the remote host 300 to enable the remote host 300 to obtain the requested content directly from the content system 306.

Figure 4:
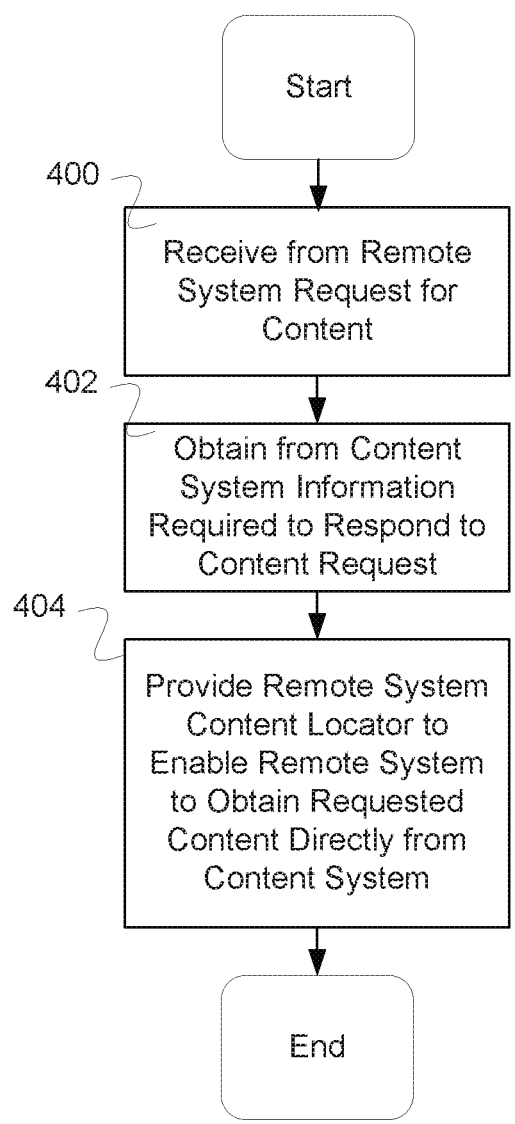
FIG. 4 illustrates an embodiment of a process for providing direct access to managed content.

FIG. 4 illustrates an embodiment of a process for providing direct access to managed content. In some embodiments, the process of FIG. 4 is implemented on a content management system, such as content management system 304 of FIG. 3. In the example shown, in 400 a request for content is received. In some embodiments, the request is received at a content management system from a remote system, e.g., from a browser, client, or other application running on the remote system. In 402, information required to respond to content request is obtained from a content system. In some embodiments, at 402 a content management system that received the request received at 400 sends to the content system a query associated with the requested content and receives response data from the content system. In 404, a content locator based at least in part on the information obtained in 402 is forwarded to the remote system from the content management system. The content locator enables the remote system to obtain the requested content directly from the content server by using the content locator, e.g., a URL, to request the content directly from the content server, without the content first passing through the content management system. In some embodiments, obtaining content directly includes data transfers through multiple intermediate nodes of a data communication network such as the interne, a local area network, a wide area network, or any other network for transferring data, with the transfer originating from the content server and terminating at the remote host without first being sent to the content management system.

Figure 5:
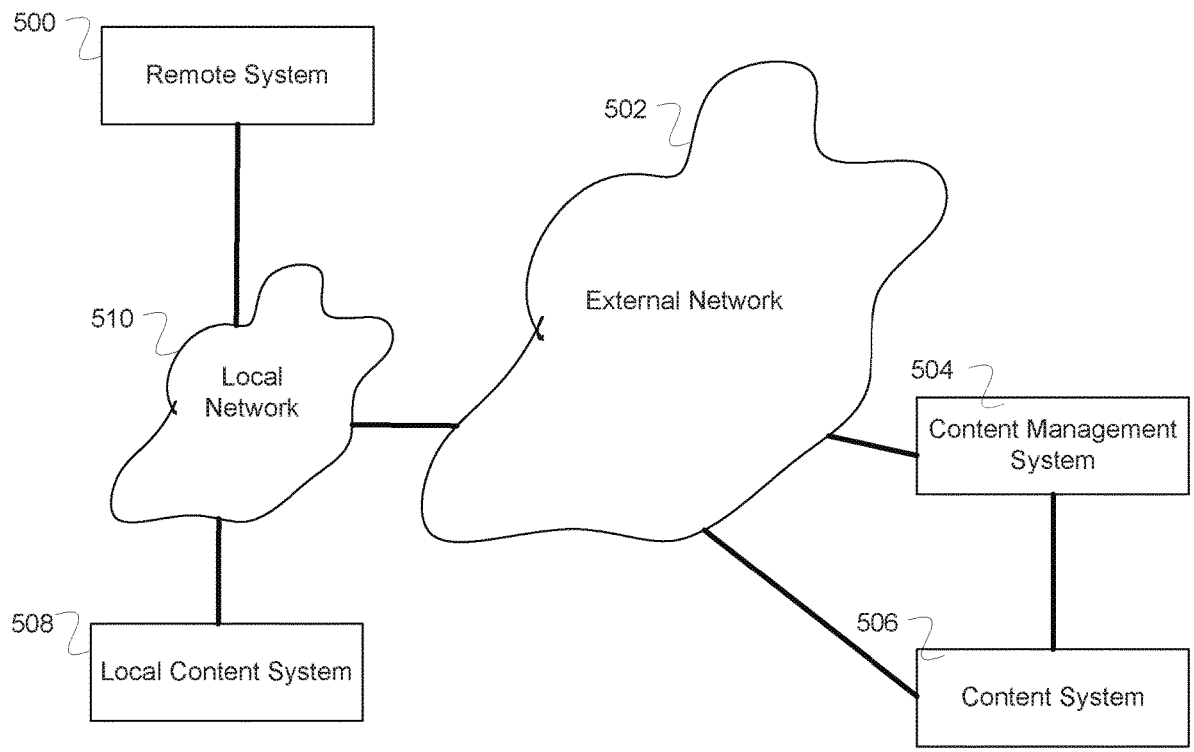
FIG. 5 is a block diagram illustrating an embodiment of a system for providing local access to managed content.

FIG. 5 is a block diagram illustrating an embodiment of a system for providing local access to managed content. In the example shown, remote system 500 is connected to external network 502 via local network 510. In various embodiments, local network 510 comprises an internal network, such as a local area network, intranet, etc. and/or a portion of one or more private or public networks, such as the internet. In various embodiments, network 502 includes one or more of the following: a local area network, a wide area network, a wireless network, a wired network, the internet, an intranet, and/or any other network for connecting systems. In some embodiments, networks 502 and 510 comprise portions of the same network or an integrated and/or interconnected plurality of networks. Content management system 504 is connected to network 502 and content system 506. Content system 506 is connected to external network 502. In various embodiments, content management system 504 is connected to content system 506 using a direct connection, a local area network, a wide area network, the internet, an intranet, and/or any other network for connecting systems. In some embodiments, content system 506 does not have a connection to network 502. In some embodiments, content management system 504 does not have a connection to content system 506 except through network 502, and the content management system 504 and content system 506 exchange data via network 502. In some embodiments, content management system 504 and content system 506 are both implemented in one physical computer system. In various embodiments, remote system 500 is geographically remote from or geographically near to content management system 504.

Local content system 508 is connected to local network 510 in the example shown. In some embodiments, local system 508 comprises a local cache server. Content in local content system 508 in some embodiments includes locally cached content that is managed by content management system 504, and in various embodiments contains files, objects, metadata, or other data that is also contained in content system 506. In some embodiments, content management system 504 authenticates a remote system, or the user of the remote system, including checking that the remote system, or the user of the remote system, has permission to access the requested content from or store the requested content to local content system 508. In some embodiments, local content system 508 is one of a plurality of systems containing content managed by content management system 504. A local content system is selected to interact with remote system 500 based on criteria such as distance from remote system 500, available bandwidth for the given local content system, speed of access between remote system 500 and the local content system 508, or any other relevant metric. In some embodiments, a locator or a prioritized list of locators usable to read content from or write (store) content to one or more local content systems is provided to remote system 500 by content management system 504 based at least in part on information—including, for example, candidate file(s) or object(s) location(s), local content system distances from remote system 500, bandwidth access to local content system(s), and candidate file(s) or object(s) attributes (e.g. encryption and/or compression characteristics)—received from content system 506. In some embodiments, local content system 508 comprises a local cache server associated with a geographic or other area, region, sub-network, etc. with which remote system 500 is associated, and in some such embodiments requests from remote system 500 to perform operations with respect to content managed by content management system 504 and/or stored in content system 506 are serviced by providing to remote system 500 a URL and/or other data usable by remote system 500 to perform an operation it has requested to perform with respect to specific managed content, such as retrieve and/or writing such content.

Upon receiving from remote system 500 a request to perform an operation with respect to managed content, such as a request to retrieve a particular stored object, content management system 504 obtains from content system 506 data required to respond. In some embodiments, content system 506 and/or content management system 504 maintains and/or has access to a database, service, and/or other source of information concerning which objects comprising the content managed by content management system 504 and/or stored by content system 506, as applicable, currently is available from local content system 508 and, in some embodiments, whether the content as currently stored at local content system 508 is fully synchronized with a corresponding master object stored at content system 506. If the content is not currently stored at the local content system, in some embodiments a copy is pushed to the local content system 508, e.g., via network 502 and/or local network 510 in the example shown, to enable remote system 500 to perform the requested operation with respect to the content through direct communication with local content system 508. In some embodiments, if requested content as stored at local content system 508 is not fully synchronized with a corresponding master object stored at content system 506, the content as stored at local content system 508 is synchronized with the master object prior to responding to the request. In various embodiments, if requested content is not currently available from a local content system associated with the requesting host and/or a copy as stored at the local content system is not fully synchronized, the content management system 504 responds to the request by providing to the remote system 500 a response that includes a locator and/or other data usable by the remote system 500 to obtain the content through direct communication with the local content system 508, which then uses at least a portion of the locator and/or other data to obtain from content system 506—in various embodiments through content management system 504 and/or directly from content system 506—the content and/or updated portions thereof, as applicable, required to provide the requested content to remote system 500.

In some embodiments, remote system 500 is one of a plurality of hosts able to access content management system 504 via network 502. In some embodiments, content system 506 and/or local content system 508 are implemented in one or more physical computer systems each of which includes one or more storage devices. In some embodiments, content management system 504 does not act as a middleman by obtaining requested content from content system 506 or local content system 508 and forwarding the content on to the remote system 500. Instead, for at least some requests (e.g., for objects larger than a threshold size), the content management system 504 is configured to obtain from the content system 506, and content system 506 is configured to provide, data required by the content management system 504 to form one or more URL's or other identifiers, locators, etc. to be provided by the content management system 504 to the remote host 500 to enable the remote host 500 to obtain the requested content locally from the local content system 508.

Figure 6A:
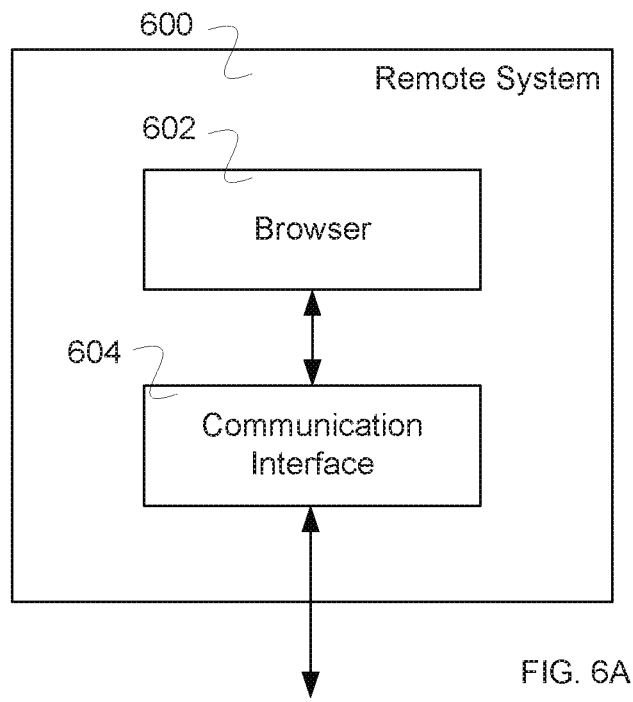
FIG. 6A is a block diagram illustrating an embodiment of a remote system.

FIG. 6A is a block diagram illustrating an embodiment of a remote system. In the example shown, remote system 600 includes browser 602 and communication interface 604. Browser 602 interacts with a user to obtain information for and provide information from the remote system. In some embodiments, browser 602 interacts with the user by displaying information on a monitor and by receiving information from the user from a keyboard and/or a mouse. Communication interface 604 is used to communicate with a connected network, such as network 502 or local network 510 of FIG. 5. In some embodiments, remote system 500 includes storage devices and/or memory, not shown in FIG. 6A, to store information, and one or more processors to process information. In various embodiments, browser 602 comprises an internet browser, Microsoft Internet Explorer™, Mozilla Firefox™, a Microsoft Outlook™ or Office™ plug-in, or any other application interfacing with the user and allowing navigation of a stored set of content. In some embodiments, browser 602 and communication interface 604 are used to exchange data with a content management system, such as content management system 504 of FIG. 5, which in various embodiments comprises a web or other application server or another system configured to manage stored content. In some embodiments, browser 602 and communication interface 604 are used to send to a content management system a request for content, receive from the content management a response comprising data usable to obtain the request content directly from a local content system, e.g., one of a plurality of local content systems (e.g., one or more URL's or other locators or identifiers), and request and obtain the requested content directly from a local content system or one of a plurality of local content systems. In various embodiments, remote system 600 is implemented using one computer system, multiple computer systems, or any other appropriate hardware and software systems.

Figure 6B:
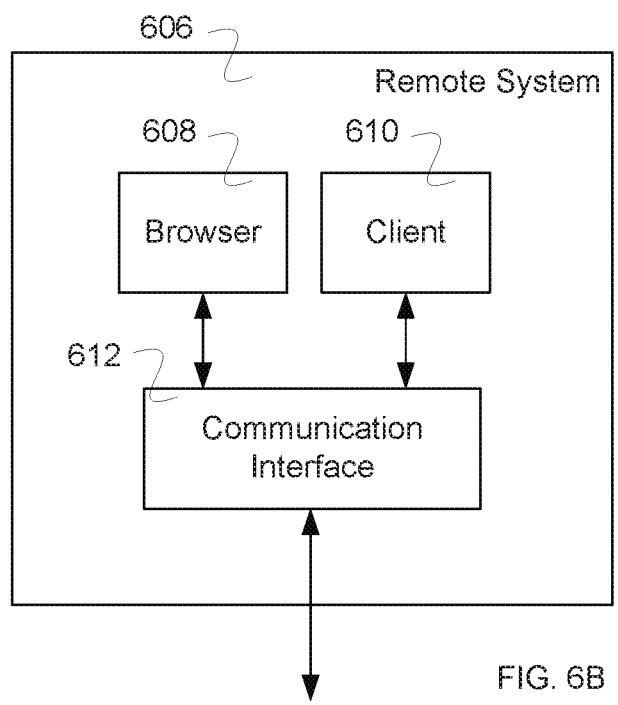
FIG. 6B is a block diagram illustrating an embodiment of a remote system.

FIG. 6B is a block diagram illustrating an embodiment of a remote system. In the example shown, remote system 606 includes browser 608, client 610 and communication interface 612. Browser 608 interacts with a user to obtain information for and provide information from the remote system. In some embodiments, browser 608 interacts with the user by displaying information on a monitor and by receiving information from the user from a keyboard and/or a mouse. Communication interface 612 is used to communicate with a connected network. In some embodiments, remote system 606 includes storage devices and/or memory to store information and one or more processors to process information. In the example shown, client 610 is spawned by browser 608 to handle at least certain aspects of the interaction with the content management system and/or the content system or local content system. In some embodiments, client 610 provides functionality beyond the functionality it would be practical and/or possible to provide using browser 608 alone to interact with the content management system and/or content system. In some embodiments, client 610 tracks the status of content transfers and handles interrupted data transfers by resuming where the transfer was interrupted from the same or a different source. In some embodiments, client 610 handles the details of the data transfer by determining and/or tracking the locations on the storage devices where the data is coming from and to. In some embodiments, browser 608 is used to send a request for content to the content management system and the content management system responds by sending to client 610 a URL or other locator usable by the client 610 to obtain the requested content directly from the local content system. In some embodiments, client 610 uses the URL or other locator to request and receive the content locally from the local content system. In some embodiments, if the content is not available already in the local content system, then the local content system will retrieve the requested content from a content system, an alternate content system, or any other appropriate content storage location/system based at least in part on information in the content locator. In various embodiments, remote system 606 is implemented using one computer system, multiple computer systems, or any other appropriate hardware and software systems.

In some embodiments, remote system 606 spawns client 610 to receive the content locator (and/or a prioritized list of locators) and obtain the content from one of a plurality of local content systems using the content locator. Client 610 also handles errors, picks up data transfers from where they left off after an interruption, and retrieves content from a different (e.g., backup, secondary, etc.) local content system if the original system is no longer available to transfer content. In addition, client 610 takes care of handshaking between the content management system and remote system 606 as well as the local content system and the remote system 606. Client 610 manages the location that data is transferred to and from including the relevant folder locations, the file and/or object names, how to display the folders, and any differences required due to operating system conventions (e.g. different naming protocols, etc.). In some embodiments, client 610 handles a digital signature or other type of security that allows verification of the interaction between remote system 606 and the content management system and between the between remote system 606 and the local content system. In various embodiments, client 610 handles compression or decompression and/or encryption or decryption of the transferred content as appropriate. In some embodiments, client 610 reverts to the transfer of content through the content management system in the event that it is not possible (for file structure, access, or any other reason) to transfer content directly to or from the system.

Figure 7:
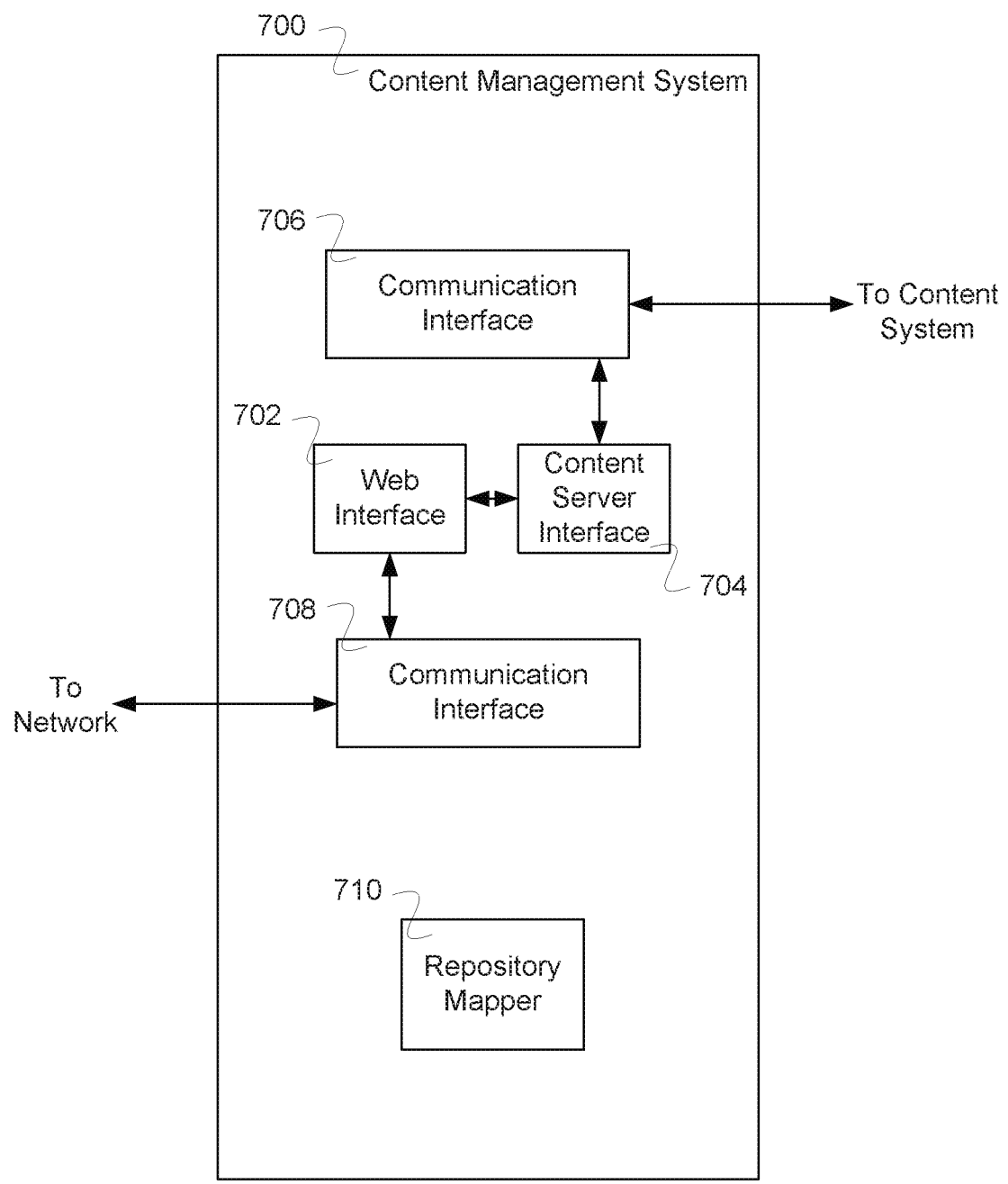
FIG. 7 is a block diagram illustrating an embodiment of a content management system.

FIG. 7 is a block diagram illustrating an embodiment of a content management system. In the example shown, content management system 700 includes communication interface 708, web interface 702, content system interface 704, communication interface 706, and repository mapper 710. Web interface 702 is connected to communication interface 708. Communication interface 708 comprises a network interface card (NIC) or other interface. Web interface 702 interacts with one or more remote systems to handle requests to read data from and/or write data to a content system. Web interface 702 is connected to content system interface 704 to be able to obtain information required to handle content requests and requests to write content. Repository mapper 710 determines which local caching servers are available from the list of candidate file(s)/object(s) locations and which local caching servers those candidate file(s)/object(s) are associated with. In some embodiments, repository mapper 710 creates a repository map periodically and caches the map in order to reduce resources that would be required to create a repository map for each query. In some embodiments, content management system 700 checks whether a request to read data from and/or write data to a content system is allowed for the requestor. In some embodiments, content management system 700 has information delineating permissions for different users and/or remote systems regarding their allowed operations for data including reading permissions, writing permissions, editing permissions, and any other appropriate permissions.

In some embodiments, web interface 702 communicates via the Internet and/or one or more private and/or public networks, using communication interface 708. In some embodiments, web interface 702 includes a set of web tools and/or web development components. In some embodiments, web interface 702 comprises a web application built using a web development tool or kit associated with content server interface 704. In some embodiments, content server interface 704 comprises a framework for managing content for web or other applications running on content management system 700. In some embodiments, content server interface 704 comprises classes of content management objects that web interface 702 may be configured to invoke, as required, e.g., in a manner specified in an API (application programming interface) or other specification or definition, to accomplish content management related tasks, such as storing, tracking, finding, retrieving, associating metadata with, and otherwise managing stored content. In some embodiments, content system interface 704 includes an API and/or a library that provides an API to the content server. In some embodiments, web interface 702 and content server interface 704 comprise software code executed by one or more processors associated with content management system 700.

Content system interface 704 is connected to a content server or other content system through communication interface 706. In some embodiments, content system interface 704 communicates with the content server using communication interface 708 and communication interface 706 is omitted. In various embodiments, content management system 700 is implemented using multiple computer systems, one computer system, or any other appropriate hardware and software systems.

Figure 8:
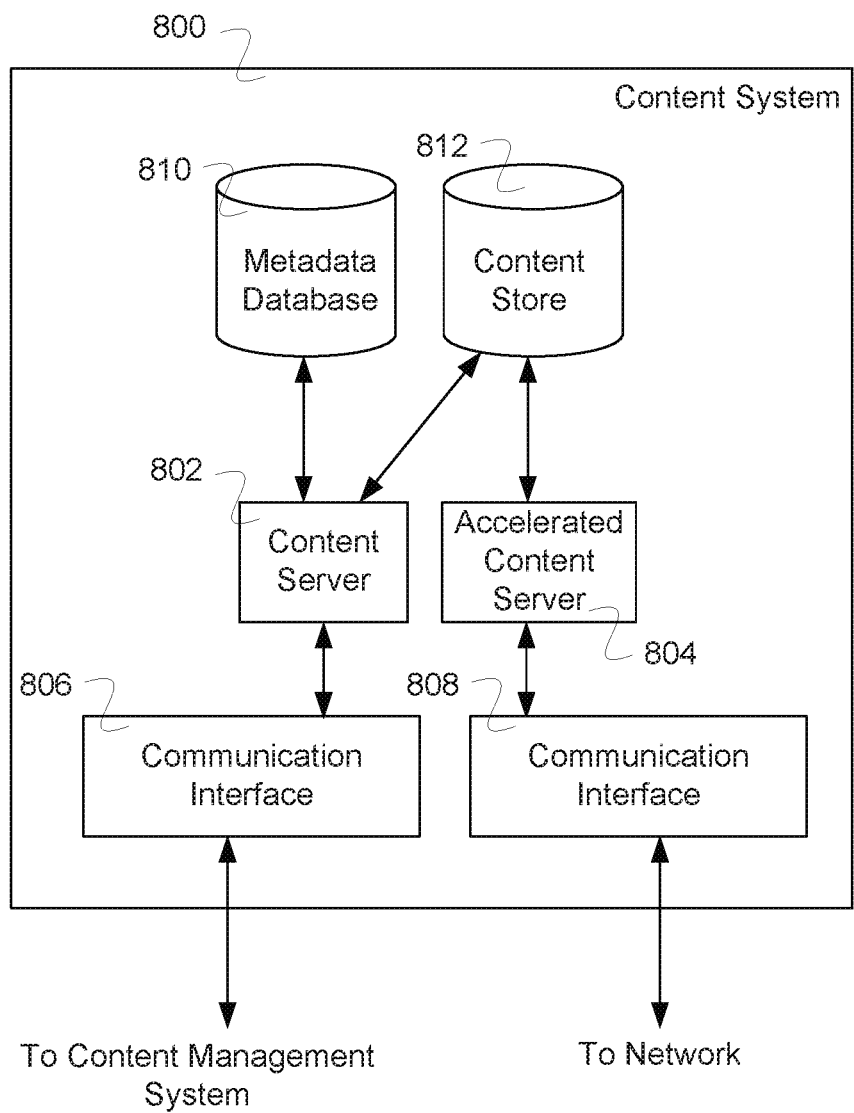
FIG. 8 is a block diagram illustrating an embodiment of a content system.

FIG. 8 is a block diagram illustrating an embodiment of a content system. In the example shown, content system 800 includes content server 802, accelerated content server 804, communication interface 806, communication interface 808, metadata database 810, and content store 812. In some embodiments, content store 812 is used to store one or more sets of managed content managed by a content management system. In some embodiments, a set of managed content includes one or more stored content objects, such as documents, files, or other objects. In some embodiments, content server 802 is queried through communication interface 806 to search for relevant content to respond to a content request. Content server 802 searches for the relevant content by interrogating the metadata database 810 and/or the stored content in content 812. In various embodiments, returned information from content system 800 to content management system in regard to a content request includes information regarding the distance the content relevant to the content request is from the remote system or any other relevant metric to the remote system.

Accelerated content server 804 is accessed directly from a network through communication interface 808 so that files can be directly read from and written to content store 812 by one or more local content systems. In some embodiments, direct access of an local content system by a remote system through a network improves performance by avoiding multiple data transfers through a content management system so that the content management system content is only accessed once, where the local content system is managed by a content management system so that content in content system 800 and one or more local content systems are kept in appropriate states (e.g. up-to-date copies of files are kept in the content system and local content system(s)). In various embodiments, content system 800 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, metadata database 810 contains metadata information about the content in content store 812 and content in one or more local caching stores. Examples of metadata include when and by whom documents were created, modified, edited, reviewed, and approved; keywords related to documents; version data; routing and collaboration data; date/time the content was created, modified, etc.; and data associating two or more stored objects with each other, e.g., to create and manage a "virtual" document or object. In various embodiments, metadata also include information about distances between remote systems and local content systems or any other relevant metric that may affect the selection or prioritized listing of local content systems that are interacted with by a remote system in response to a content request or a request to write (store) content. In various embodiments, keywords in metadata database 810 are entered by the creator, editor, modifier, or approver of the document or by an automatic process or engine that scans the document to extract or identify relevant keywords, such as by using natural language or other linguistic technologies to identify key concepts based on the words comprising the document.

In some embodiments, content server 802 maintains a file system or other hierarchical organization or view of content in content store 812 and accelerated content server 804 has no file system of its own and instead uses the file system of content server 802 to read/write content from/to content store 812. In some embodiments, accelerated content server 804 comprises a web server.

In some embodiments, content server 802 has information regarding files, documents, or objects that have been transferred out of content store 812 and/or local caching stores, i.e., objects that have been "checked out" for editing or other use by a user, enabling management of requests for content. In some embodiments, a content management system associated with the content server keeps track of which objects have been checked out. In some such embodiments, a subsequent request to the content management system to retrieve an object that has been checked out and has not yet been checked back in is denied, e.g., by sending a reply indicating the content is not currently available, is checked out to a user identified in the reply, etc.

In some embodiments, content system 800 tracks and/or has access to a database, service, and/or other resource that tracks, which data objects are currently available from which local content store(s). In some embodiments, content system 800 tracks and/or determines periodically and/or at the time of responding to a query whether a local content system associated with the request, e.g., one that has the requested content and/or is associated with a remote host that made the request, is (or was the last time status was checked and/or reported) online or, in some embodiments, which of a plurality of local content systems able to service the request is/are online.

Figure 9:
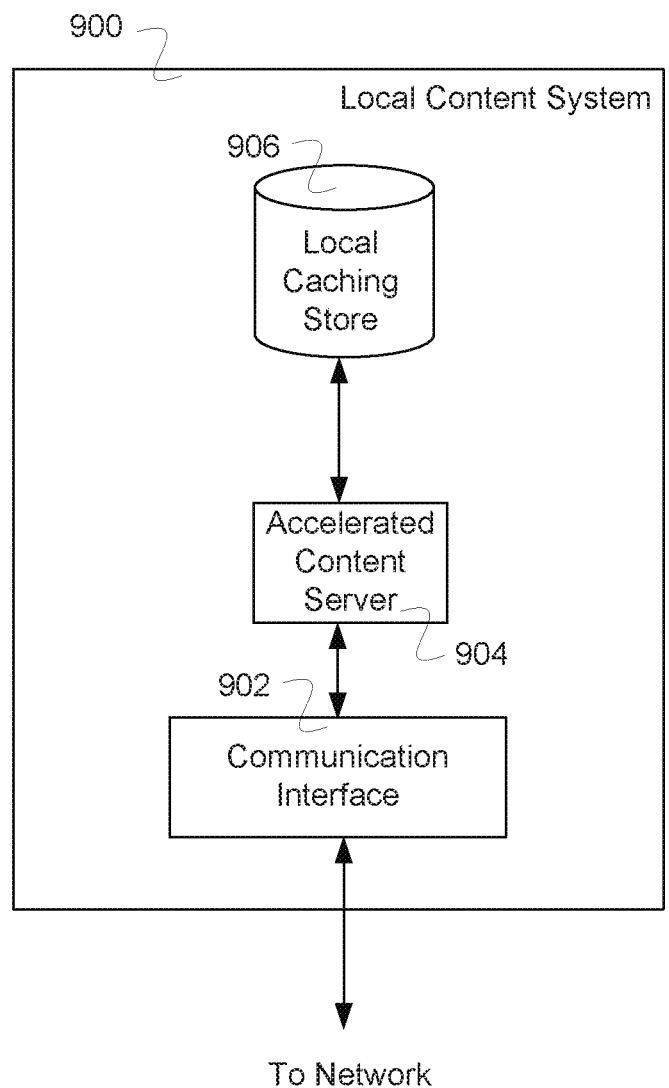
FIG. 9 is a block diagram illustrating an embodiment of a local content system.

FIG. 9 is a block diagram illustrating an embodiment of a local content system. In the example shown, local content system 900 includes communication interface 902, accelerated content server 904, and local caching store 906. In some embodiments, in the event that the content requested using a content locator (or a prioritized list of content locators) is not available on local content system 900, local content system will retrieve the requested content from a content system, an alternate content system, or any other appropriate content store/system based at least in part on information in the content locator. In some embodiments, local caching store 906 is used to store one or more sets of managed content managed by a content management system. In some embodiments, a set of managed content includes one or more stored content objects, such as documents, files, or other objects. In some embodiments, a remote system queries a content management system and the content management system replies with information usable by the remote system to read or write content directly with local content system 900. Local caching store 906 is accessed by accelerated content server 904 to service content requests received from a network through communication interface 902. In various embodiments, content management system selects local content system 900 as the appropriate system for a remote system to interact with based on being closer in distance to the remote system or because there is better access between local content system 900 and the remote system. In some embodiments, local content system 900 is selected based on its relationship to the requesting host (e.g., each is associated with the same branch office, geographic region, ISP, range of IP addresses, etc.).

Accelerated content server 904 is accessed directly from a network through communication interface 902 so that files can be directly read from and written to local caching store 906 in various embodiments by a content management system, a content system, and/or a requesting host. In some embodiments, direct access of local content system 900 by a remote system through a network improves performance by avoiding data transfers through a content management system. Even in an embodiment in which content is provided to the local content system initially via an indirect transfer from a primary content system first to a content management system and then from the content management system to the local content management system, efficiencies are realized as subsequent operations requested by the remote system are performed through direct communication with the local content system. In some embodiments, local content system 900 is managed by a content management system so that content in a primary content system and one or more local content systems are kept in appropriate states (e.g. up-to-date copies of files are kept in the content system and local content system(s)). In some embodiments, local content system 900 validates content from a content system, a remote content system, or any other content system. In various embodiments, local content system 900 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, accelerated content server 904 maintains a file system or other hierarchical organization or view of content in local caching store 906. In some embodiments, local content system 900 also includes a content server and accelerated content server 904 has no file system of its own and instead uses the file system of the content server to read/write content from/to local caching store 906. In some embodiments, accelerated content server 904 comprises a web server.

Figure 10:
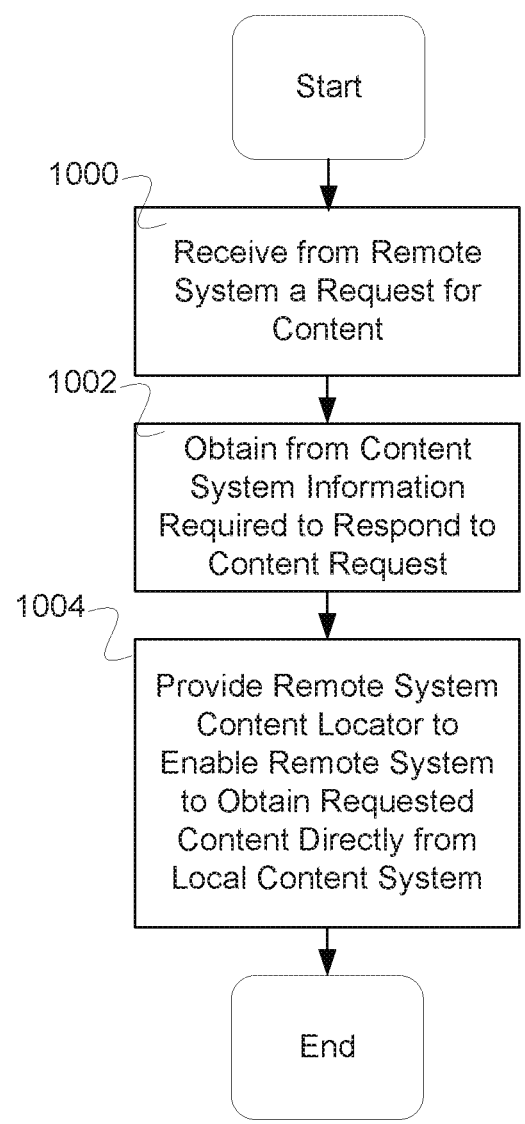
FIG. 10 illustrates an embodiment of a process for providing local access to managed content.

FIG. 10 illustrates an embodiment of a process for providing local access to managed content. In some embodiments, the process of FIG. 10 is implemented on a content management system, such as content management system 504 of FIG. 5. In the example shown, in 1000 a request for content is received. In some embodiments, the request is received at a content management system from a remote system, e.g., from a browser, client, or other application running on the remote system. In 1002, information required to respond to content request is obtained from a content system. In some embodiments, at 1002 a content management system that received the request received at 1000 sends to the content system a query associated with the requested content and receives response data from the content system. In some embodiments, the content system is a primary content system associated with the requested content, such as the content system 506 of FIG. 5. In some embodiments, the content management system and/or content system is/are configured to determine which, if any, local content system(s) is/are associated with the host from which the request was received. In 1004, a content locator (or a list of prioritized locators) based at least in part on the information obtained in 1002 is forwarded to the remote system from the content management system. The content locator (or prioritized list of locators) enables the remote system to obtain the requested content directly from a local content system, or in some embodiments one of a plurality of local content systems, by using the content locator, e.g., a URL, or a list of URL's, to request the content directly from the local content system. In some embodiments, the local content system may have to retrieve the requested content once from a content system, an alternate content system, or any other appropriate content storage server/system. In some embodiments, obtaining content locally and/or directly includes data transfers through multiple intermediate nodes of a data communication network such as the internet, a local area network, a wide area network, or any other network for transferring data, with the transfer originating from the local content system and terminating at the remote host. In various embodiments, the local content system is selected from a plurality of local content systems based on distance to the requesting remote system, bandwidth of a connection to the requesting remote system, access time from the requesting remote system, or on any other performance criteria for selecting an appropriate local content system. In some embodiments, the selection of a local content system is based at least in part on information the content management system receives from a content server.

Figure 11:
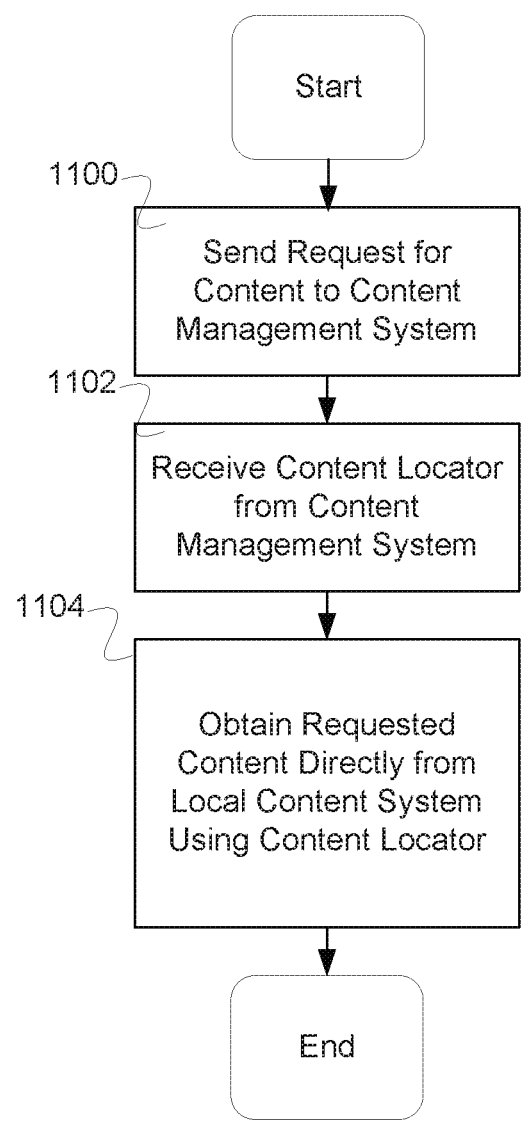
FIG. 11 illustrates an embodiment of a process for accessing managed content locally.

FIG. 11 illustrates an embodiment of a process for accessing managed content locally. In some embodiments, the process of FIG. 11 is implemented on a remote host, such as remote system 500 of FIG. 5. In some embodiments, the process of FIG. 11 is implemented at least in part by a browser, client, and/or other application, or any suitable combination thereof. In the example shown, in 1100 a request for content is sent to a content management system. The content request can be a request for a specific file or object managed by the content management system or a request for files or objects that satisfy one or more criteria; for example, files or objects that were created by John Doe, files or objects that were signed by Jane Doe, or files or objects that are related to email messages sent by Thomas Smith on a specific date. In 1102, a content locator (or a list of prioritized locators) is received from the content management system. In some embodiments, the content locator comprises a script that is run by the remote system and includes a URL (or a list of prioritized URL's) that enables the remote system to access content directly from a local content system (or on one of a plurality of local content systems). In 1104, the content locator is used to obtain the requested content directly from the local content system. The local content system may have to retrieve the requested content once from a content system, an alternate content system, or any other appropriate content storage server/system.

Figure 12:
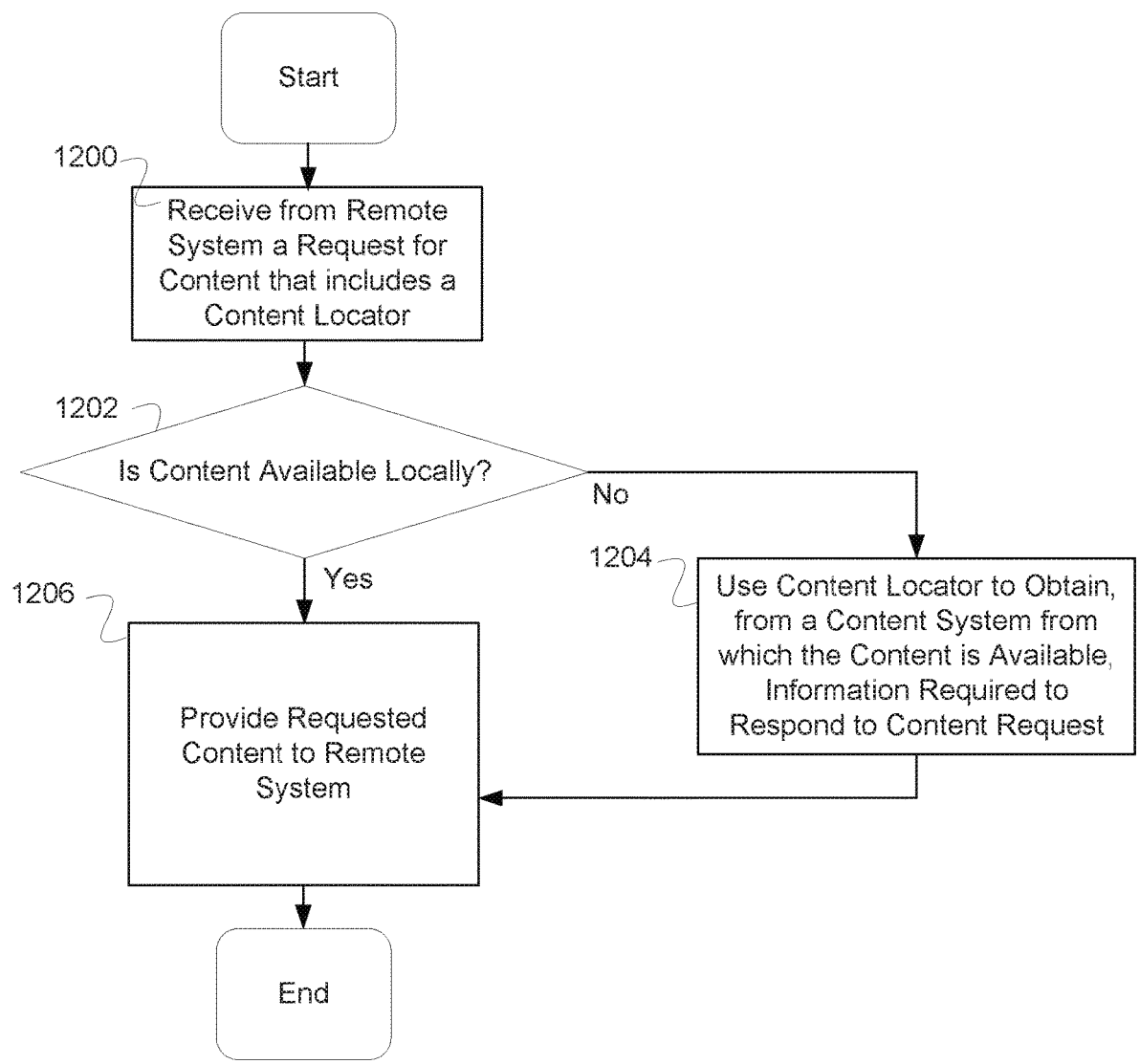
FIG. 12 illustrates an embodiment of a process for providing local access to managed content.

FIG. 12 illustrates an embodiment of a process for providing local access to managed content. In some embodiments, the process of FIG. 12 is implemented on a local content system. In 1200, a request for content, the request including a content locator associated with the content, is received from a remote system. In 1202, it is determined if the requested content is available locally. If the content is not available at the local content system, then in 1204 the local content system retrieves the requested content from a content system, an alternate content system, or any other appropriate content storage server/system, using information based at least in part on the content locator, and control is transferred to 1206. If the content is available on the local content system, or once the content has been obtained in 1204, in 1206 the content is provided to the remote system based at least in part on information in the content locator. In some embodiments, a content management system provides to the requesting remote system a content locator that includes, if the content is not already present at a local content system associated with the requesting remote system, data required by the local content system to obtain a copy of the content from another (e.g., a primary, alternate, remote, or other) content system. In some embodiments, a primary content system queried by the content management system maintains and/or has access to data indicating which content is currently available at the local content system and for each object whether it is in a valid (e.g., fully updated) state. If an object is already available at the local content system (and, in some embodiments, it is determined to be current), the content system provides to the content management system a query response that includes data usable by the content management system to generate a content locator that identifies the object as stored at the local content system. If the content system determines the object is not currently available from the local content system (or is not up to date as stored at the local content system), the primary content system provides to the content management system data usable by the content management system to form a content locator that includes data required by the local content system to obtain the content (or updates thereto) from the primary content system and/or some other source. In some embodiments the content system generates and provides the locator to the content management system.

Figure 13:
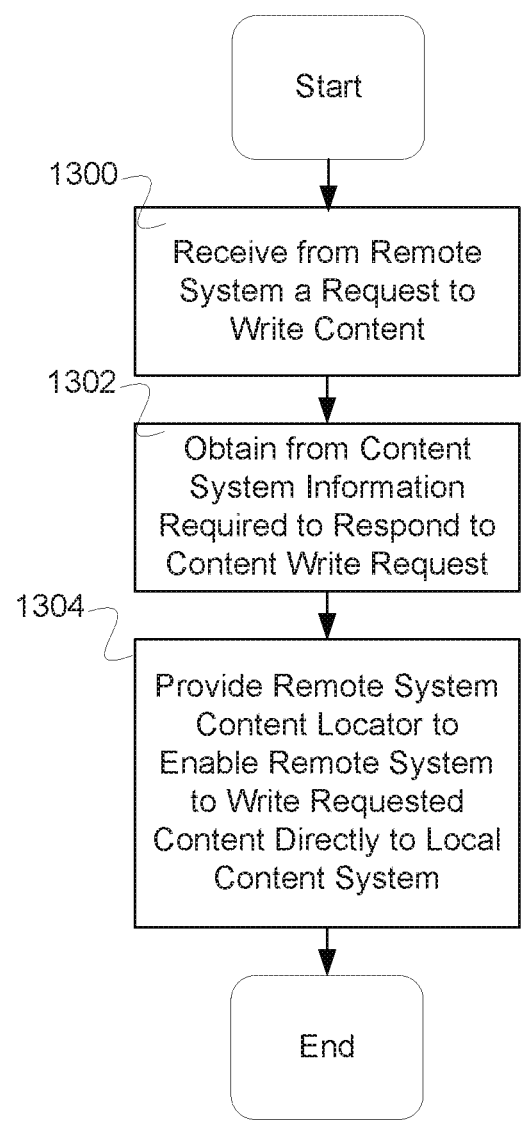
FIG. 13 illustrates an embodiment of a process for providing local access to managed content.

FIG. 13 illustrates an embodiment of a process for providing local access to managed content. In some embodiments, the process of FIG. 13 is implemented on a content management system. In the example shown, a request to write content is received in 1300. In some embodiments, the request is from a remote system and is received at a content management system. In 1302, information required to respond to the request to write content is obtained from an associated content system. In some embodiments, at 1302 a content management system that received the request received at 1300 sends to a content system associated with the object to be written, the remote system that made the request, and/or an application with which the object is associated, a request for information required to enable the remote system to write the object directly to a local content system. In some embodiments, if the content to be written is new, a new object is instantiated at a primary content system to represent the content and the information obtained at 1302 includes data associated with the newly instantiated object. In 1304, a content locator (or a list of prioritized locators) based at least in part on the information obtained at 1302 is forwarded to the remote system. The content locator (or a list of prioritized locators) enables the remote system to write the content directly to a local content system (or one of a plurality of local content systems). The local content system may have to transfer the requested content once at a later time to a content system, such as the content system from which the information obtained in 1302 was obtained, an alternate content system, or any other appropriate content storage server/system. In some embodiments, writing directly to the local content system includes data transfers through multiple intermediate nodes of a data communication network such as the interne, a local area network, a wide area network, or any other network for transferring data. In some embodiments, the content management system that manages the content in a content system and in one or more local content systems ensures that the content in the content system and the local content systems are appropriately kept up to date, including by transferring content between the content system and local content system(s) as necessary.

Figure 14:
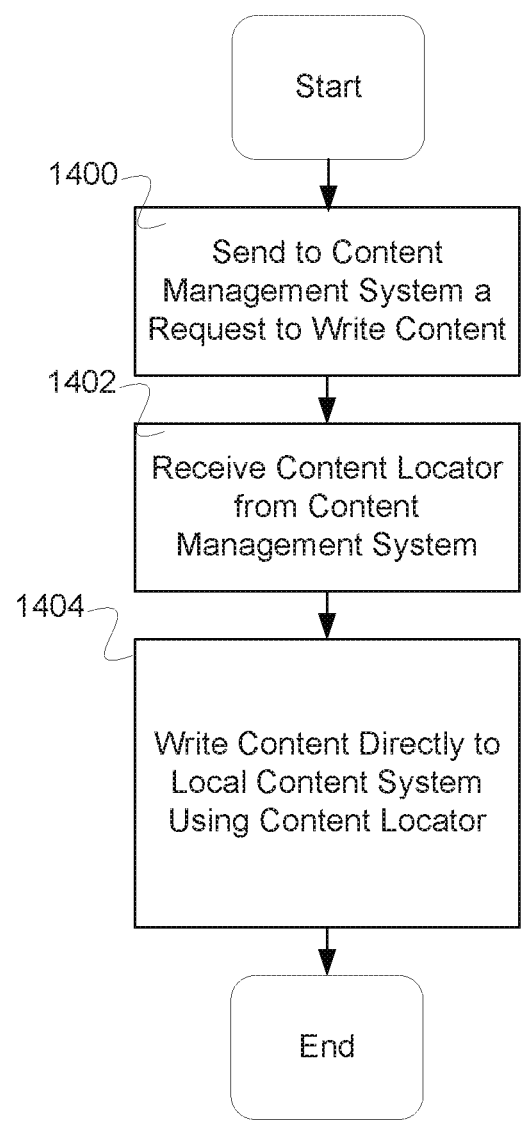
FIG. 14 illustrates an embodiment of a process for accessing managed content locally.

FIG. 14 illustrates an embodiment of a process for accessing managed content locally. In some embodiments, the process of FIG. 14 is implemented on a remote host, such as remote system 500 of FIG. 5. In the example shown, a request to write content is sent to a content management system in 1400. Examples of a request to write content include a request modify a specific file or object and/or to add or otherwise associate a new object with the content managed by the content management system. In 1402, a content locator (or list of prioritized content locators) is received from the content management system. In some embodiments, the content locator comprises a script that is run by the remote system and includes a URL (or prioritized list of URL's) that enables the remote system to write content through an accelerated content server on a local caching storage device. In various embodiments, the content locator is a Java™ script or any other executable or self-executing piece of code or script. In 1404, the content locator is used to write the content directly to one of a plurality of local content system, where the local content system may have to transfer the requested content once at a later time to a content system, an alternate content system, or any other appropriate content storage server/system. In some embodiments, the remote system spawns a client to receive the content locator and write the content to the local content system using the content locator. The client also handles errors, picks up data transfers from where they left off after an interruption, and handles the situation when the local content system that the content is being transferred to is no longer available (e.g. selecting in conjunction with the content management system another local content system, for example, the next local content system in the prioritized list).

Figure 15:
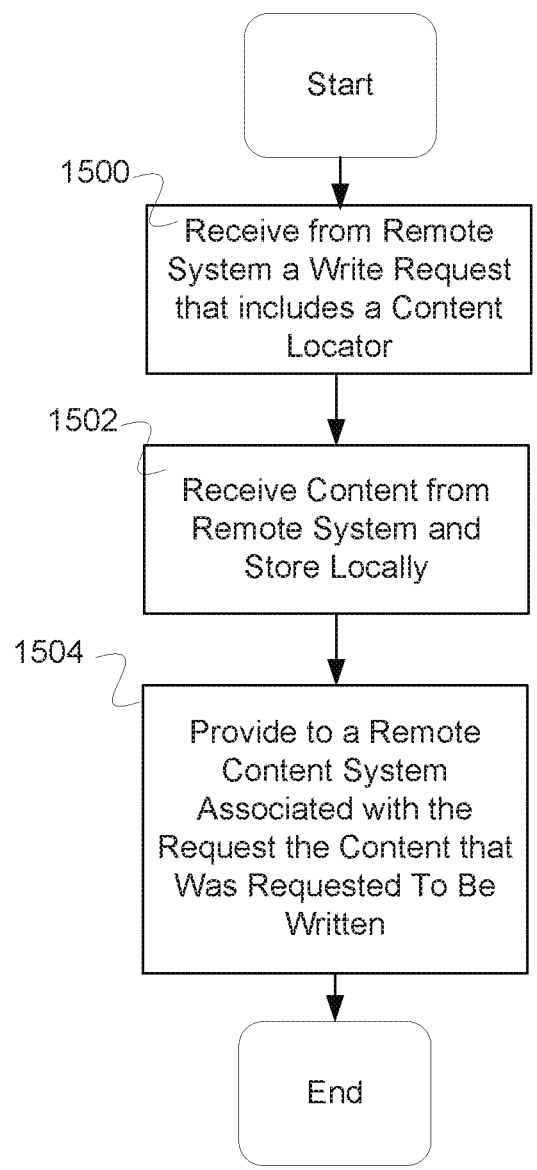
FIG. 15 illustrates an embodiment of a process for providing local access to managed content.

FIG. 15 illustrates an embodiment of a process for providing local access to managed content. In some embodiments, the process of FIG. 15 is implemented on a local content system. In 1500, a request to write content, the request including a content locator, is received from a remote system. In 1502, the content desired to be written is received from the remote system and stored locally. In 1504, a content system is provided with the content that was requested to be written. In various embodiments, the content is written to a content system at the request of the content management system, at a time determined by the local content system, or on a periodic or continuous basis (i.e., as data is written). In some embodiments, the content is written to one or more content systems based at least in part on information in and/or associated with the content locator.

While a number of the examples described in detail above involve request to retrieve and/or write content, the technique described herein may be used to enable a host to perform any desired operation with respect to managed content through direct communication with a local content system, such as a local cache server.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system for providing access to managed content comprising:
   a content management system coupled to a network,
   a first content system connected to the content management system, the first content system storing managed content managed by the content management system; and
   a second content system coupled to the network,
   the content management system configured to:
   receive a request for content from a client system, the request including criteria;
   based on the request, send a query to the first content system, the query including the criteria;
   receive a query response from the first content system, the query response including information about content that matches the criteria; and
   determining a content locator based at least in part on the query response received from the first content system, the content locator usable by the client system to access content associated with the request directly from the second content system through which the content associated with the request is accessible; and
   send the content locator to the client system,
   the first content system configured to:
   receive the query from the content management system;
   search the managed content for the content that matches the criteria;
   return the query response to the content management system;
   the second content system configured to:
   receive the content locator from the client system;
   based on a determination that the content associated with the request is available at the second content system, return the content associated with the request to the client system;
   based on a determination that the content associated with the request is not available at the second content system:
   access the content associated with the request directly from the first content system using data contained in the content locator; and
   return the content associated with the request to the client system.

2. The system for providing access to managed content of claim 1, wherein the first content system is configured to maintain a metadata database containing metadata of on the managed content, wherein searching the managed content for the content that matches the criteria comprises interrogating the metadata database.

3. The system for providing access to managed content of claim 1, wherein the information about the content that matches the criteria comprises a distance of the content that matches the criteria from the second content system.

4. The system for providing access to managed content of claim 3, wherein the content management system is configured to select the second content system as an appropriate system for the client system to interact with to access the content associated with the request based on the distance.

5. The system for providing access to managed content of claim 1, wherein the content management system is configured to select the second content system as an appropriate system for the client system to interact with to access the content associated with the request based on a relationship between the client system and the second content system.

6. The system for providing access to managed content of claim 1, wherein:
   the query response comprises a location of a candidate object that matches the criteria and
   the content management system is configured to:
   create a repository map indicating a plurality of content systems with which the candidate object is associated; and
   cache the repository map for use with a subsequent request.

7. The system for providing access to managed content of claim 1, further comprising, a third content system; and
   wherein determining the content locator based at least in part on the query response received from the first content system comprises determining a plurality of content locators, each of the plurality of content locators usable to the client system to directly access the content associated with the request from a different one of the second content system or the third content system.

8. The system for providing access to managed content of claim 1, wherein the content locator is a URL.

9. The system for providing access to managed content of claim 8, wherein sending the content locator to the client system comprises sending a script that contains the URL to the client system, the script executable by the client system.

10. The system for providing access to managed content of claim 1, wherein the content management system is configured to send a prioritized list of content locators to the client system.

11. A computer program product comprising a non-transitory computer readable medium storing a set of computer-readable instructions, the set of computer-readable instructions comprising instructions executable to:
   receive a request for content from a client system, the request including criteria;

based on the request, send a query to a first content system that stores managed content for a content management system, the query including the criteria;

receive a query response from the first content system, the query response including information about content that matches the criteria; and determine a content locator based at least in part on the query response received from the first content system, the content locator usable by the client system to access content associated with the request directly from a second content system through which the content associated with the request is accessible, the content locator including data usable by the second content system to access the content associated with the request from the first content system in the event that the client system attempts to access the content associated with the request from the second content system and the content associated with the request is not available at the second content system.

12. The computer program product of claim 11, the set of computer-readable instructions comprising instructions executable to:

maintain a metadata database containing metadata of on the managed content;

search the managed content for the content that matches the criteria by interrogating the metadata database.

13. The computer program product of claim 11, wherein the information about the content that matches the criteria comprises a distance of the content that matches the criteria from the second content system.

14. The computer program product of claim 13, the set of computer-readable instructions comprising instructions executable to select the second content system as an appropriate system for the client system to interact with to access the content associated with the request based on the distance.

15. The computer program product of claim 13, the set of computer-readable instructions comprising instructions executable to select the second content system as an appropriate system for the client system to interact with to access the content associated with the request based on a relationship between the client system and the second content system.

16. The computer program product of claim 13, the set of computer-readable instructions comprising instructions executable to:

read a location of a candidate object that matches the criteria from the query response;

create a repository map indicating a plurality of content systems with which the candidate object is associated; and cache the repository map for use with a subsequent request.

17. The computer program product of claim 13, wherein determining the content locator based at least in part on the query response received from the first content system comprises determining a plurality of content locators, each of the plurality of content locators usable to the client system to directly access the content associated with the request from a different one of a plurality of content systems.

18. The computer program product of claim 13, wherein the content locator is a URL.

19. The computer program product of claim 18, wherein sending the content locator to the client system comprises sending a script that contains the URL to the client system, the script executable by the client system.

20. The computer program product of claim 13, wherein the content management system is configured to send a prioritized list of content locators to the client system.

* * * * *